United States Patent
Tang

(10) Patent No.: US 9,671,241 B2
(45) Date of Patent: Jun. 6, 2017

(54) NAVIGATION SYSTEM HAVING ROUTE CUSTOMIZATION MECHANISM AND METHOD OF OPERATION THEREOF

(75) Inventor: Ky Tang, Milpitas, CA (US)

(73) Assignee: Telenav, Inc., Santa Clara, CA (US)

( * ) Notice: Subject to any disclaimer, the term of this patent is extended or adjusted under 35 U.S.C. 154(b) by 1335 days.

(21) Appl. No.: 12/365,148

(22) Filed: Feb. 3, 2009

(65) Prior Publication Data

US 2010/0198508 A1    Aug. 5, 2010

(51) Int. Cl.
*G01C 21/36* (2006.01)
*G01C 21/34* (2006.01)

(52) U.S. Cl.
CPC ................. *G01C 21/3469* (2013.01)

(58) Field of Classification Search
CPC .................................... G01C 21/3469
USPC ............... 701/123, 200–226, 414; 340/450.2
See application file for complete search history.

(56) References Cited

U.S. PATENT DOCUMENTS

| | | | |
|---|---|---|---|
| 5,742,922 A * | 4/1998 | Kim | 701/201 |
| 6,078,850 A * | 6/2000 | Kane et al. | 701/31.4 |
| 6,087,965 A | 7/2000 | Murphy | |
| 6,092,021 A | 7/2000 | Ehlbeck et al. | |
| 6,615,133 B2 * | 9/2003 | Boies et al. | 701/209 |
| 6,701,248 B2 | 3/2004 | Petzold et al. | |
| 6,714,857 B2 | 3/2004 | Kapolka et al. | |
| 6,885,919 B1 * | 4/2005 | Wyant et al. | 701/21 |
| 7,155,321 B2 | 12/2006 | Bromley et al. | |
| 7,406,448 B2 | 7/2008 | Leberknight | |
| 2007/0005237 A1 | 1/2007 | Needham et al. | |
| 2007/0290039 A1 * | 12/2007 | Pfleging et al. | 235/384 |
| 2008/0125958 A1 | 5/2008 | Boss et al. | |
| 2008/0133120 A1 | 6/2008 | Romanick | |
| 2009/0005974 A1 | 1/2009 | Lenneman et al. | |
| 2009/0157289 A1 * | 6/2009 | Graessley | 701/123 |
| 2010/0042314 A1 * | 2/2010 | Vogt et al. | 701/200 |

OTHER PUBLICATIONS

Prevention of Motor-Vehicle Accidents, Army in Europe Regulation 385-55, published Feb. 13, 2006.*
Random House Webster's College Dictionary, Definition of "pavement", Random House, Inc., New York, 1996, p. 992.

* cited by examiner

*Primary Examiner* — Mark Holcomb
(74) *Attorney, Agent, or Firm* — IP Investment Law Group

(57) ABSTRACT

A method of operation of a navigation system having route customization mechanism includes: generating a base route; selecting a custom route priority based on a route preference; generating a modified route based on the base route and the custom route priority; and sending the modified route for displaying on a device.

20 Claims, 10 Drawing Sheets

NAVIGATION SYSTEM HAVING ROUTE CUSTOMIZATION MECHANISM AND METHOD OF OPERATION THEREOF

TECHNICAL FIELD

The present invention relates generally to a navigation system and more particularly to a system for a navigation system with a route customization mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality. Some of the research and development strategies focus on new technologies while others focus on improving the existing and mature technologies. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

In addition, rapid fluctuations in fuel prices have become a paramount concern for consumers. Current navigation systems can generate routes for shortest distance and fastest time but do not take fuel efficiency, environmental concerns, and fuel costs into account. The advancements with navigation system need to incorporate these growing concerns.

Thus, a need still remains for a navigation system that can create custom routes to a destination that can maximize fuel efficiency and minimize fuel consumption. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system having route customization mechanism including: generating a base route; selecting a custom route priority based on a route preference; generating a modified route based on the base route and the custom route priority; and sending the modified route for displaying on a device.

The present invention provides a navigation system having route customization mechanism including: a user interface for selecting a custom route priority based on a route preference; a control unit, coupled to the user interface, for generating a base route, generating a modified route based on the base route and the custom route priority; and a communication unit, coupled to the control unit, for sending the modified route for displaying on a device.

Certain embodiments of the invention have other aspects in addition to or in place of those mentioned above. The aspects can become apparent to those skilled in the art from a reading of the following detailed description when taken with reference to the accompanying drawings.

BEST MODE FOR CARRYING OUT THE INVENTION

Figure 1:
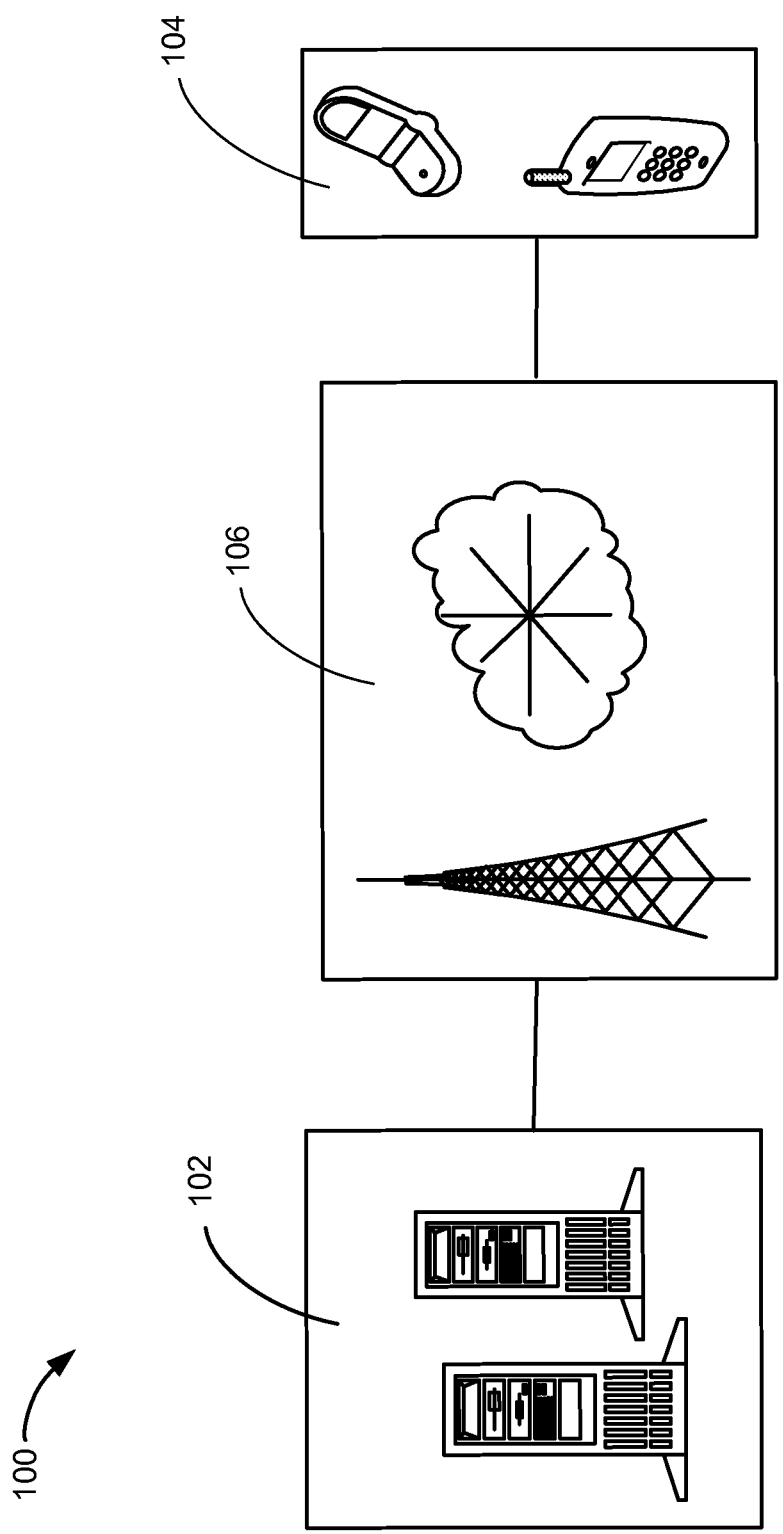
FIG. 1 is an example of an environment using an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

The navigation information is presented by longitude and latitude related information. The navigation information also includes a velocity element comprising a speed component and a direction component.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, or a combination thereof.

The term "fuel" referred to herein can include gasoline, diesel, bio-diesel, ethanol, electric power, hydrogen fuel-cell, or a combination thereof, as examples. The term "fuel efficiency" referred to herein is the measure of a distance unit per a volume unit. A distance unit can include miles or kilometers. A volume unit can include gallons or liters. The term "fuel consumption" referred to herein is the actual volume of fuel used.

Referring now to FIG. 1, therein is an example of an environment 100 using an embodiment of the present invention. The environment 100 applies to any embodiment of the present invention described later. The environment includes a first device 102, such as a server or client. The first device 102 can be linked to a second device 104, such as a client or server, with a communication path 106, such as a network.

The first device 102 can be any of a variety of centralized or decentralized computing devices. For example, the first device 102 can be a computer, a computer in a grid computing pool, a virtualized computer, a computer in a cloud computing pool, or a computer in a distributed computing topology. The first device 102 can include routing functions or switching functions for coupling with the communication path 106 to communicate with the second device 104.

The second device 104 can be of any of a variety of mobile devices. For example, the second device 104 can be a cellular phone, personal digital assistant, a notebook computer, or other multi-functional mobile communication or entertainment devices having means for coupling to the communication path 106.

The communication path 106 can be a variety of networks. For example, the communication path 106 can include wireless communication, wired communication, optical, ultrasonic, or the combination thereof. Satellite communication, cellular communication, Bluetooth, Infrared Data Association standard (IrDA), radio data system (RDS), HD radio data, wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include personal area network (PAN), local area network (LAN), metropolitan area network (MAN), and wide area network (WAN).

For illustrative purposes, the first device 102 is shown in a single location, although it is understood that the server can be centralized or decentralized and located at different locations. For example, the first device 102 can represent real or virtual servers in a single computer room, distributed across different rooms, distributed across different geographical locations, embedded within a telecommunications network, virtualized servers within one or more other computer systems including grid or cloud type computing resources, or in a high powered client device.

Further for illustrative purposes, the environment 100 is shown with the second device 104 as a mobile computing device, although it is understood that the second device 104 can be different types of computing devices. For example, the second device 104 can be a mobile computing device, such as notebook computer, another client device, or a different type of client device.

Yet further for illustrative purposes, the environment 100 is shown with the first device 102 and the second device 104 as end points of the communication path 106, although it is understood that the environment 100 can have a different partition between the first device 102, the second device 104, and the communication path 106. For example, the first device 102, the second device 104, or a combination thereof can also function as part of the communication path 106.

Figure 2:
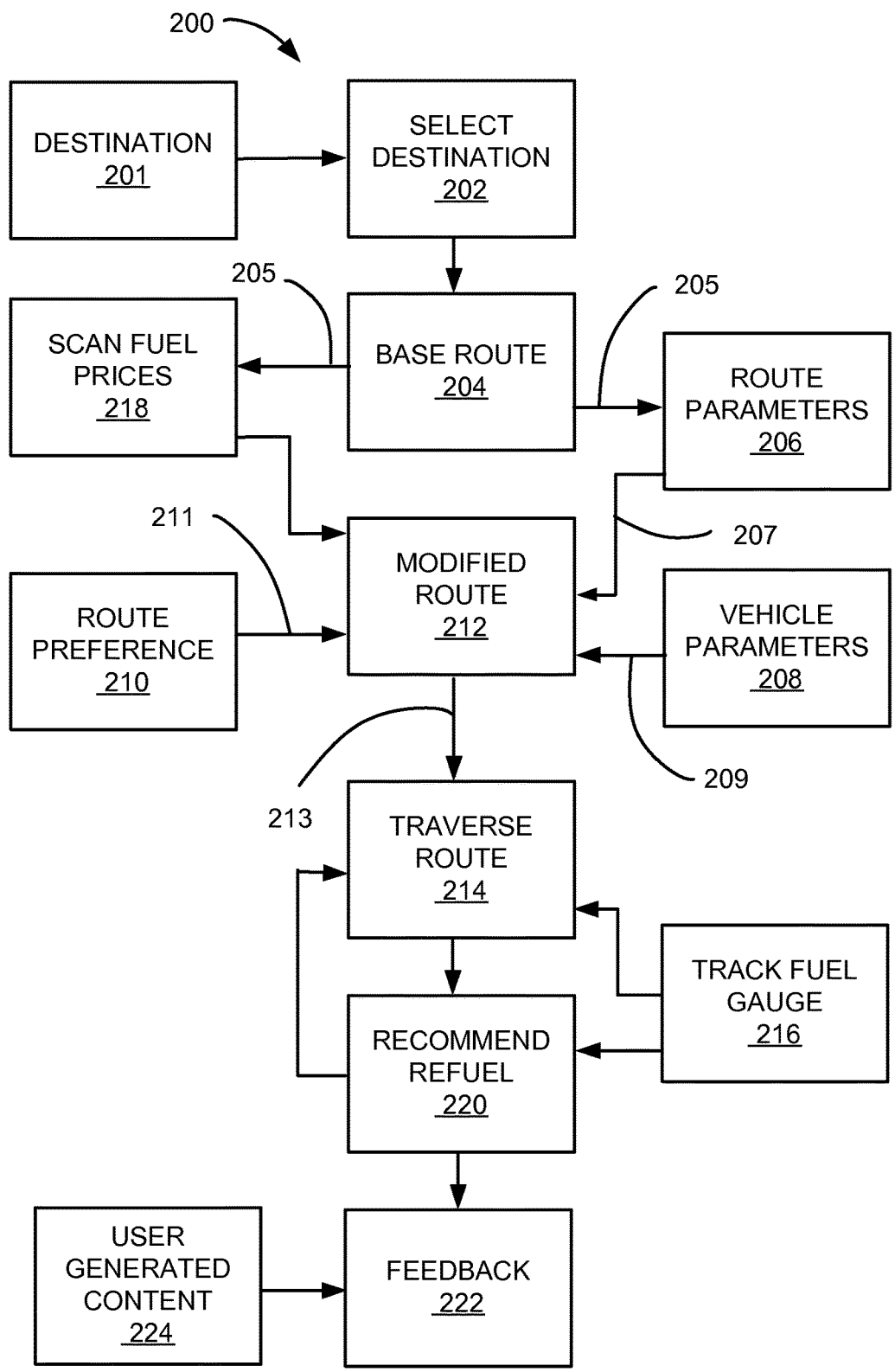
FIG. 2 is a flow chart of a navigation system in a first embodiment of the present invention.

Referring now to FIG. 2, therein is shown a flow chart of a navigation system 200 in a first embodiment of the present invention. The navigation system 200 provides routes based on terrain information, traffic information, fuel consumption, vehicle information, map information, and customized priorities selection by the navigation system 200 or manually entered.

The navigation system 200 can include a user destination 201, a select destination module 202, a base route module 204, base routes 205, a route parameters module 206, a route profile 207, a vehicle parameters module 208, a vehicle profile 209, a route preference module 210, a custom route priority 211, a modified route module 212, a modified route 213, a traverse route module 214, a track fuel gauge module 216, a scan fuel prices module 218, a recommend refuel module 220, a feedback module 222, and a user generated content 224. For illustrative purposes, the navigation system 200 is shown having discrete modules, although it is understood that the navigation system 200 can include other modules or modules in different configurations.

The user destination 201 can be linked to the select destination module 202. The select destination module 202 can be linked to the base route module 204. The base route module 204 can be linked to the route parameters module 206 and the scan fuel prices module 218. The route parameters module 206 can be linked to the modified route module 212. The scan fuel prices module 218 can be linked to the modified route module 212. The modified route module 212 can be linked to the traverse route module 214. The traverse route module 214 can be linked to the recommend refuel module 220. The recommend refuel module 220 can be linked to the feedback module 222. These modules can utilize the same or portion of the same information. For illustrative purposes, the navigation system 200 is shown having discrete modules, although it is understood that the navigation system 200 can include other modules or modules in different configurations.

In addition, the vehicle parameters module 208 can be linked to the modified route module 212. The route preference module 210 can be linked to the modified route module 212. The track fuel gauge module 216 can be linked to the traverse route module 214 and the recommend refuel module 220. The recommend refuel module 220 can loop back to the traverse route module 214.

The select destination module 202 can allow a driver to input the user destination 201 into the navigation system 200. The select destination module 202 can send the user destination 201 to the base route module 204.

The base route module 204 can receive the user destination 201 from the select destination module 202. The base route module 204 can calculate a number of the base routes 205 to the user destination 201 and can display the total distance of each of the base routes 205. For example, the base routes 205 can include multiple routes to the user destination including using different local streets, freeways, and a combination thereof. The base route module 204 can send the base routes 205 to the route parameters module 206 and the scan fuel prices module 218.

The route parameters module 206 can receive the base routes 205 from the base route module 204. The route parameters module 206 can scan for parameters like street types, elevation changes, different road pavement types, and traffic along each of the base routes 205. Using these parameters, the route parameters module 206 can generate the route profile 207 for each of the base routes 205. The route profile 207 can be sent the modified route module 212. The modified route module 212 can use the route profile 207 to calculate the total fuel estimation of each of the base routes 205.

The vehicle parameters module 208 can detect parameters about the driver's vehicle that can affect fuel consumption and fuel efficiency. These parameters can include the vehicle model, the vehicle condition such as tire pressure, the cargo weight including passengers, and driver behavior. For example, parameters like the vehicle model can inform the vehicle parameters module 208 of the vehicle's base weight, engine size, performance statistics, tire size, fuel tank size, and other pertinent information. Parameters like tire pressure, cargo weight, and driver behavior can be inputted manually by the driver or automatically detected. The vehicle parameters module 208 can send vehicle parameter information to the modified route module 212.

The route preference module 210 can allow the driver to set a preference to the types of routes displayed to the driver. The route preference module 210 can allow a driver to set a priority based on three types of route preferences in order to create the custom route priority 211. The three types of route preference can include most ecological route, shortest route, and fastest route. The custom route priority 211 can be sent to the modified route module 212.

For example, the driver can assign values or weights to each route preference in order to create the custom route priority 211. The modified route module 212 can use the custom route priority 211 to filter and display the base routes 205.

The scan fuel prices module 218 can scan the fuel prices of stations along the base routes 205. In addition, the scan fuel prices module 218 can calculate the fuel consumption needed to reach each fuel station along the base routes 205. The scan fuel prices module 218 can send updated fuel prices to the modified route module 212.

The modified route module 212 can compile the route profile 207, the vehicle profile 209, and the custom route priority 211 to generate the total fuel estimation for each of the base routes 205. The modified route module 212 an also display the estimated fuel consumption of each of the base routes 205 and display the total estimated time of each of the base routes 205.

For example, the modified route module 212 can display one of the base routes 205 as having a predicted fuel consumption of eight volume units, a fuel efficiency of 23 distance units per volume unit and an estimated total time of two hours and seven minutes. This information can assist a driver in selecting a route based on a total time goal or a fuel consumption goal.

The modified route module 212 can use the route profile 207 and the vehicle profile 209 to modify the base routes 205 for calculating the total fuel estimation of each of the base routes 205. For example, to calculate the total fuel estimation for one of the base routes 205, the modified route module 212 can combine data from the route profile 207 and the vehicle profile 209. The modified route module 212 can apply vehicle weight and engine acceleration parameters to road conditions, traffic, and elevation changes. Using route and vehicle parameters, the modified route module 212 can display a fuel estimation that is unique for the type of vehicle, the current traffic conditions, and terrain of each of the base routes 205.

The modified route module 212 can display the total time and fuel estimation of each of the base routes 205 that reflect updated information from the route and vehicle parameters. The driver can select one of the base routes to traverse. The modified route module 212 can generate the modified route 213 once the driver selects one of the base routes 205. The modified route 213 can be sent to the traverse route module 214.

The traverse route module 214 can execute navigation operations for the modified route 213. Navigation operations can include turn-by-turn instructions and audio prompts of routing instructions. The traverse route module 214 can receive updated fuel gage information from the track fuel gauge module 216.

The track fuel gauge module 216 can track the amount of fuel in the vehicle. The track fuel gauge module 216 can determine the amount of fuel in the vehicle through a sensor attached to the vehicle or calculate the amount through driver input. For example, the driver can input the amount of fuel and the octane level of the fuel in the fuel tank. The track fuel gauge module 216 can calculate the current level of fuel in the vehicle by subtracting the inputted amount by the fuel consumption on the trip. The track fuel gauge module 216 can send fuel gauge updates to the traverse route module 214 and the recommend refuel module 220.

The recommend refuel module 220 can recommend refueling options to a driver. The recommend refuel module 220 can determine how much range the vehicle has remaining and scan the fuel prices within that range. The recommend refuel module 220 can recommend the fuel station with the lowest actual cost within that range. For example, if the vehicle's fuel tank is at a low level, the recommend refuel module 220 will recommend the closest and cheapest fuel station within that range.

If the vehicle's fuel tank is not at a low level, the recommend refuel module 220 will scan all the fuel prices within the vehicle's range. The recommend refuel module 220 can recommend the fuel station with the lowest estimated cost. The recommend refuel module 220 can calculate the lowest estimated cost by combining the listed fuel price with the price of fuel consumed to reach that fuel station. Once the driver has selected a fuel station, the recommend refuel module 220 can enable the traverse route module 214 to detour to the fuel station.

The feedback module 222 can allow the driver to input the user generated content 224 into the navigation system 200. The user generated content 224 can include a survey that reflects the driver's behavior. The user generated content 224 can assist the navigation system 200 to calculate more accurate fuel estimations for subsequent trips. In addition, the feedback module 222 can also record driving behavior during trips. For example, the feedback module 222 can record the frequency of behaviors like rapid accelerations and rapid stops. The recorded driver behavior and the user generated content 224 can allow the navigation system 200 to more accurate calculate fuel estimations in subsequent trips.

Figure 3:
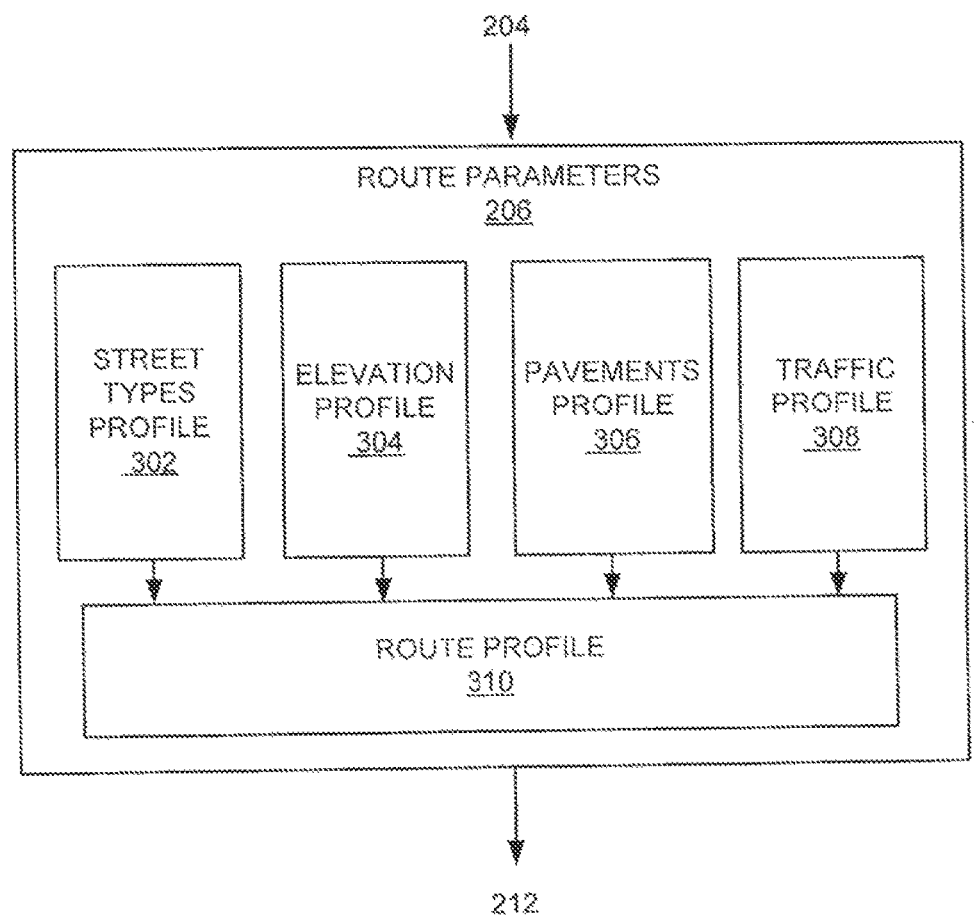
FIG. 3 is a flow chart of the route parameters module of FIG. 2.

Referring now to FIG. 3, therein is shown the flow chart of the route parameters module 206 of FIG. 2. The route parameters module 206 is linked to the base route module 204 of FIG. 2 and the modified route module 212 of FIG. 2.

The route parameters module 206 can include a street types profile module 302, an elevation profile module 304, a pavements profile module 306, a traffic profile module 308, and a route profile 310. The route parameters module 206 can receive the base routes 205 from the base route module 204. For illustrative purposes, the route parameters module 206 is shown having discrete modules, although it is understood that the route parameters module 206 can include other modules or modules in different configurations.

The street types profile module 302 can determine the types of streets within each of the base routes 205 and calculate the effect of these street types on fuel consumption. The calculations from the street types profile module 302 can be used to generate the route profile 310. The route profile 310 can be used by the modified route module 212 of FIG. 2 to generate a route's total fuel estimation.

For example, the street types profile module 302 can account for the frequency of expressways, one-way streets, boulevards, and four-lane highways within each of the base routes 205 route. The street types profile module 302 can calculate the effect of each street type on fuel efficiency and fuel consumption. The street types profile module 302 can send the street type frequency and the fuel consumption information for each of the base routes 205 to the route profile 310. The route profile 310 can be used by the modified route module 212 of FIG. 2 for calculating the total fuel estimation of each of the base routes 205.

The elevation profile module 304 can calculate fuel consumption based on elevation changes in the terrain along each of the base routes 205. The elevation profile module 304 can calculate fuel consumption based on the elevation changes. For example, the elevation profile module 304 can determine how much additional fuel is consumed by going uphill and how much fuel is saved by going downhill. The calculations from the elevation profile module 304 can be used to generate the route profile 310. The route profile 310 can be used by the modified route module 212 of FIG. 2 to generate the total fuel estimation for each of the base routes 205.

The pavements profile module 306 can calculate fuel consumption based on the different road pavements in each of the base routes 205. Road pavements can include dirt roads, asphalt, fording streams, desert sand, ice, and snow. The pavements profile module 306 can detect each different pavement type in each of the base routes 205 and the duration of each pavement type to calculate a change in fuel consumption for each of the base routes 205.

For example, the pavements profile module 306 can calculate slippage and traction information for each pavement type. If the vehicle is off-roading, the pavements profile module 306 can take into account loss of traction due to loose dirt, rocks, and wheel spin. Factors like slippage and traction can be used to calculate additional fuel consumption. The pavements profile module 306 can send road pavement information to the route profile 310 to be used by the modified route module 212 of FIG. 2.

The traffic profile module 308 can calculate how traffic conditions will affect fuel efficiency and fuel consumption for a route. For example, the traffic profile module 308 can account for idle times, low speeds, and maximum speeds. The traffic profile module 308 can also account for routes with free flowing traffic and estimate the positive effect on fuel efficiency for each of the base routes 205. The traffic profile module 308 can send the traffic information to the route profile 310 to be used by the modified route module 212 of FIG. 2.

The route profile 310 can include route information from the street types profile module 302, the elevation profile module 304, the pavements profile module 306, and the traffic profile module 308. The route profile 310 can be sent to the modified route module 212 of FIG. 2. Using the route profile 310, the modified route module 212 can determine the fuel consumption of each of the base routes 205 based on route parameters.

Figure 4:
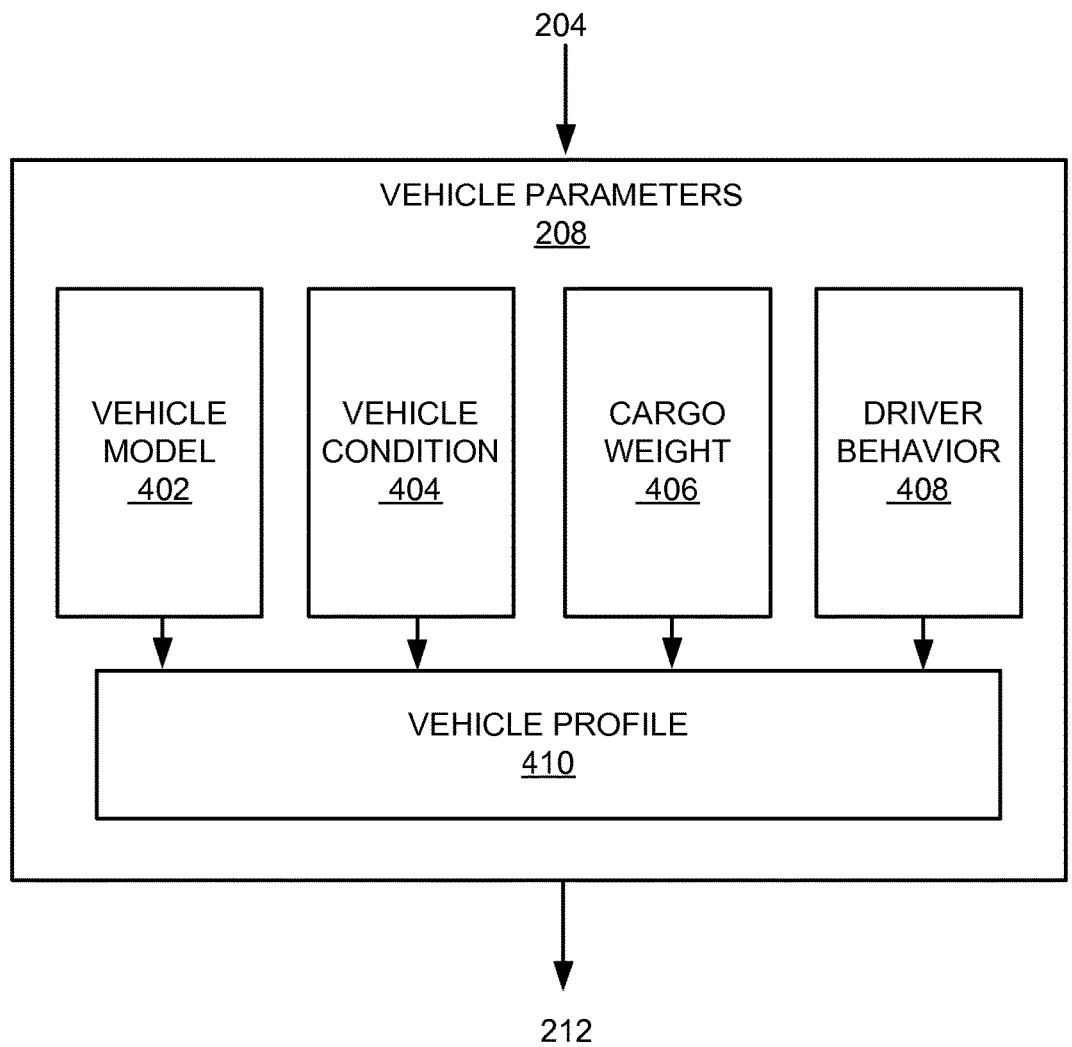
FIG. 4 is a flow chart of the vehicle parameters module of FIG. 2.

Referring now to FIG. 4, therein is shown a more detailed flow chart of the vehicle parameters module 208 of FIG. 2. The vehicle parameters module 208 can be linked to the modified route module 212 of FIG. 2.

The vehicle parameters module 208 can include a vehicle model module 402, a vehicle condition module 404, a cargo weight module 406, and a driver behavior module 408. For illustrative purposes, the vehicle parameters module 208 is shown having discrete modules, although it is understood that the vehicle parameters module 208 can include other modules, or modules in different configurations.

The vehicle parameters module 208 can detect parameters about the driver's vehicle that can affect fuel consumption. These parameters can be detected through sensors or can be inputted manually by the driver. The parameter information can be sent to the modified route module 212 to provide information needed to calculate the total fuel estimation for each of the base routes 205.

The vehicle model module 402 can detect the brand and the model of the vehicle. The vehicle model module 402 can detect the vehicle model through sensors attached to the vehicle or through driver input. The vehicle model module 402 can access databases to gain pertinent information about the vehicle. This information can include the vehicle's base weight, engine size, performance statistics, tire size, and fuel tank size. The vehicle information can be sent to the modified route module 212 in preparation for calculating the total fuel estimation for each of the base routes 205.

The vehicle condition module 404 can determine vehicle maintenance conditions that can affect fuel efficiency. Vehicle conditions and maintenance can include engine tuning and tire pressure. For example, the vehicle condition module 404, through sensors attached to the vehicle, can determine the tire pressure within all four tires. Tires at maximum pressure will decrease fuel consumption and increase fuel efficiency in contrast to tires at a low pressure.

The cargo weight module 406 can determine the additional weight in the vehicle. For example, the additional weight can include cargo and passengers in addition to the base weight of the vehicle. The cargo and passenger weight can be determined manually or automatically. The driver can estimate the additional weight, including passengers and enter the amount into the cargo weight module 406.

The driver behavior module 408 can determine driving behavior that can affect fuel efficiency. For example, driving behavior like quick accelerations after stop signs or low constant speeds can increase or decrease fuel efficiency. The driver behavior module 408 can also track statistics like average speed, maximum speed, braking frequency, and other statistics that affect fuel efficiency. Driver behavior can be determined manually or automatically. For example, the driver behavior module 408 can prompt the driver to complete a short survey of driver behavior before a trip.

In addition, the driver behavior module 408 can learn driver behavior by recording the driver's habits during a trip. For example, the driver behavior module 408 can store information including a driver's top speed, a driver's acceleration behavior, a driver's braking behavior, and a driver's cruising behavior. The driver behavior module 408 can identity frequencies in each type of driving behavior. Based on these frequencies, the driver behavior module 408 can recalculate fuel estimation for each of the base routes 205.

A vehicle profile 410 can include the information from the vehicle model module 402, the vehicle condition module 404, the cargo weight module 406, and the driver behavior module 408. The vehicle profile 410 can be sent to the modified route module 212. Applying the vehicle profile 410 to each of the base routes 205, the modified route module 212 can calculate a total fuel estimation for each of the base routes 205.

Figure 5:
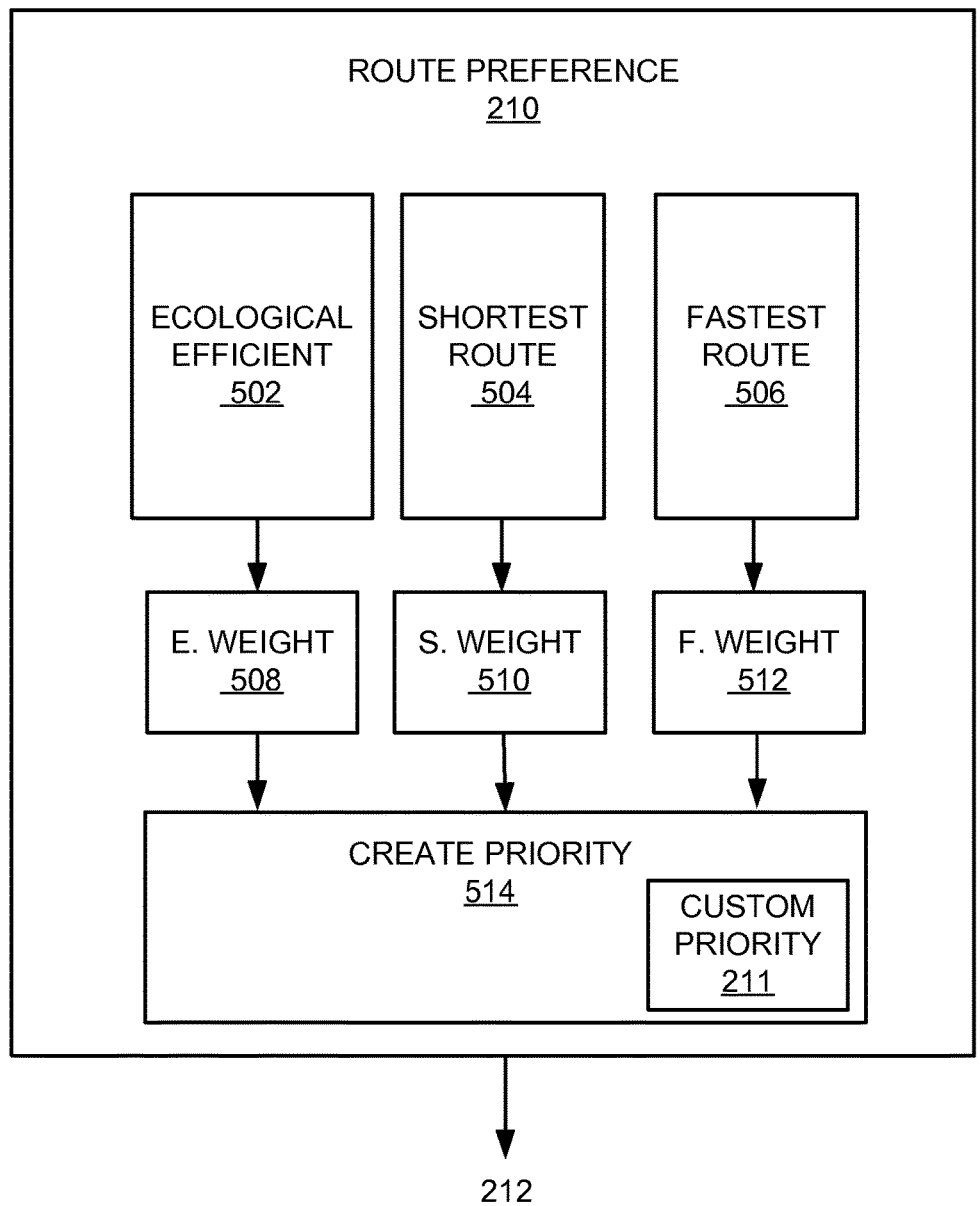
FIG. 5 is a flow chart of the route preference module of FIG. 2.

Referring now to FIG. 5, therein is shown a flow chart of the route preference module 210 of FIG. 2. The route preference module 210 is linked to the modified route module 212 of FIG. 2.

The route preference module 210 can include an ecological efficient module 502, a shortest route module 504, a fastest route module 506, an ecological weight 508, a shortest weight 510, a fastest weight 512, a create custom priority module 514 and the custom route priority 211 of FIG. 2. For illustrative purposes, the route preference module 210 is shown having discrete modules, although it is understood that the route preference module 210 can include other modules or modules in different configurations.

The route preference module 210 can allow the driver to create the custom route priority 211. The custom route priority 211 can allow the modified route module 212 to search for a route that conforms to the driver's preference. The custom route priority 211 can include the ecological weight 508, the shortest weight 510, and the fastest weight 512.

The ecological weight 508 corresponds to a preference for routes that minimize fuel consumption. The shortest weight 510 corresponds to a preference for routes that minimize distance traveled. The fastest weight 512 corresponds to minimizing time spent traversing the route.

The route preference module 210 can allow the driver to input scalar values into the ecological efficient module 502, the shortest route module 504, and the fastest route module 506. For example, the ecological efficient module 502, the shortest route module 504, and the fastest route module 506 can prompt the driver to distribute a maximum of 10 points among the modules. For illustrative purposes, the driver can input 5 points into the ecological efficient module 502, 3 points into the fastest route module 506 and 2 points into the shortest route module 504.

The ecological efficient module 502, the shortest route module 504, and the fastest route module 506 can assign a scalar value to the corresponding weight. The ecological efficient module 502 can assign a scalar value to the ecological weight 508. The shortest route module 504 can assign a scalar value to the shortest weight 510. The fastest route module 506 can assign a scalar value to the fastest weight 512.

The create custom priority module 514 can read the scalar values from the ecological weight 508, the shortest weight 510, and the fastest weight 512. The create custom priority module 514 can generate a custom route priority 516 based on the scalar values assigned to the weight modules. For illustrate purposes, the create custom priority module 514 can generate the custom route priority 516 by using the algorithm in equation 1 below.

$$ax+by+cz \tag{1}$$

The variables a, b, and c represent scalar numbers from the ecological weight 508, the shortest weight 510, and the fastest weight 512. The variables a, b, c are denoted as integers, although it is understood that a, b, and c can be real numbers which includes fractions or decimals. The variables x, y, and z can represent the ecological weight 508, the shortest weight 510, and the fastest weight 512.

As another example to achieve a route that minimizes fuel consumption, the value of 10 can be assigned to the ecological weight 508, and no points assigned to the shortest weight 510 and the fastest weight 512. In this situation, the create custom priority module 514 can generate the custom route priority 516 that can reflect the algorithm of equation 2:

$$10x+0y+0z \tag{2}$$

In this example, the scalar points were all assigned to the ecological weight 508. The custom route priority 211 that reflects equation 2 can be sent to the modified route module 212. The modified route module 212 can display routes that conform to the custom route priority 211.

As another example, a system with points to allocate, can allow the driver to select a route that reflect all of the route preferences. The driver can weight each route preference to select a route that reflects each preference to varying degrees. For example, the driver can input 5 points into the fastest route module 506, 3 points into the ecological efficient module 502, and 2 points into the shortest route module 504. The create custom priority module 514 can generate the custom route priority 516 that can include the algorithm in equation 3 below:

$$3x+2y+5z \tag{3}$$

It has been discovered that the present invention can generate routes that balance route preferences to the proportions established by the custom route priority 211. For example, the modified route module 212 of FIG. 2 can generate a route reflecting a 50 percent priority to speed, 30 percent priority to the ecological efficiency, and 20 percent priority to shortest distance. The modified route 213 of FIG. 2 will reflect a preference to speed but still account for the lower preference of shortest distance.

Figure 6:
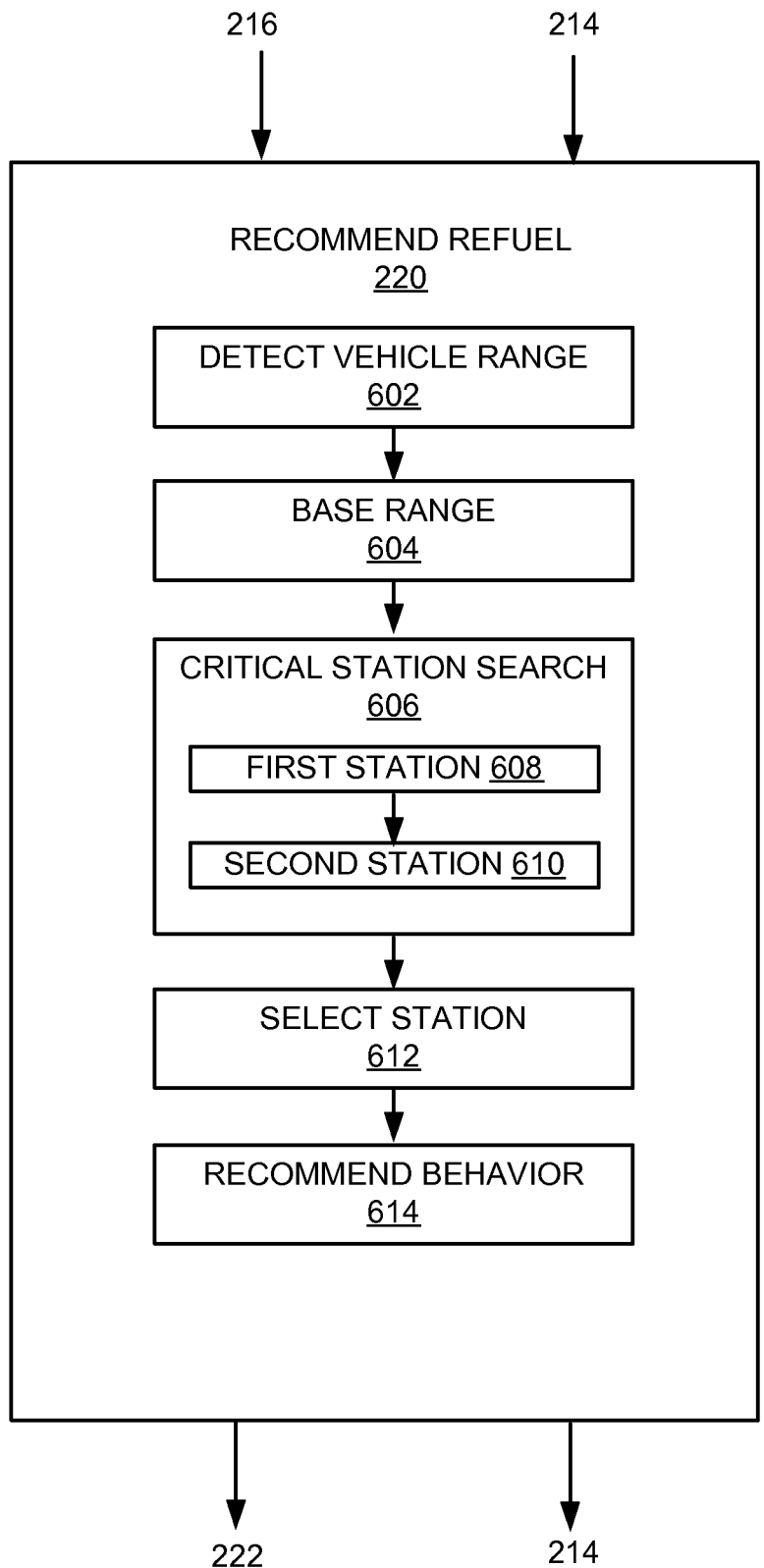
FIG. 6 is a flow chart of the recommend refuel module of FIG. 2.

Referring now to FIG. 6, therein shown is a flow chart of the recommend refuel module 220 of FIG. 2. The traverse route module 214 of FIG. 2 can be linked to the recommend refuel module 220 of FIG. 2. The track fuel gauge module 216 of FIG. 2 can be linked to the recommend refuel module 220. The recommend refuel module 220 can be linked to the feedback module 222 of FIG. 2. The recommend refuel module 220 can loop back to the traverse route module 214 of FIG. 2.

The recommend refuel module 220 can include a detect vehicle range module 602, a base range 604, a critical station search module 606, a first station fuel module 608, a second station fuel module 610, a select station module 612, and a recommend behavior module 614.

The detect vehicle range module 602 can be linked to the base range 604. The base range 604 can be linked to the critical station search module 606. The critical station search module 606 can include the first station fuel module 608 and the second station fuel module 610. The first station fuel module 608 can be linked to the second station fuel module 610. The critical station search module 606 can be linked to the select station module 612. The select station module 612 can be linked to the recommend behavior module 614. The modules within the recommend refuel module 220 are shown having discrete modules, although it is understood that the recommend refuel module 220 can include other modules or modules in different configurations.

The recommend refuel module 220 can receive fuel gauge information from the traverse route module 214. The recommend refuel module 220 can enable the traverse route module 214. Additionally, the driver can manually enable the traverse route module 214. The recommend refuel module 220 can prompt the driver to refuel based on fuel station costs and fuel consumption used to reach the fuel station.

The detect vehicle range module 602 can predict the remaining distance the vehicle can travel based on the fuel estimation of the vehicle's current course. Depending on the fuel remaining in the vehicle's fuel tank, the detect vehicle range module 602 can calculate the base range 604. The base range 604 can reflect the amount of distance units the vehicle can travel before the vehicle runs out of fuel.

The detect vehicle range module 602 can increase or decrease the base range 604 based on the terrain conditions along the route. For example, if the driver is currently climbing a mountain road, the detect vehicle range module 602 will predict a shorter value for the base range 604 than if the vehicle was going downhill.

The critical station search module 606 can receive the base range 604. The critical station search module 606 can locate and display the prices of all fuel stations within the base range 604. If the critical station search module 606 detects only one refuel station within the base range 604, the critical station search module 606 can alert the driver that a refuel must occur at that fuel station.

The critical station search module 606 can execute the first station fuel module 608. The first station fuel module 608 can calculate the fuel consumption it will take to reach the first fuel station within the base range 604. If there is only one fuel station within the vehicle's range, the first station fuel module 608 can prompt the driver of a critical fuel warning. A critical fuel warning is defined as an alert that indicates that the vehicle must refuel at the nearest fuel station. The vehicle must refuel at the nearest fuel station because the vehicle cannot reach any other fuel stations with the vehicle's base range.

If the critical station search module 606 detects more than one fuel station within the base range 604, the critical station search module 606 can enable the second station fuel module 610 after enabling the first station fuel module 608. The second station fuel module 610 can calculate the fuel consumption to reach the remaining fuel stations within the base range 604 of the vehicle.

The select station module 612 can allow the driver to select a station for refueling. The select station module 612 can display the fuel consumption calculations from the first station fuel module 608 and the second station fuel module 610. If the driver received a critical fuel level warning, the select station module 612 can recommend the first station within the base range 604. The select station module 612 can display the fuel consumption to reach the first fuel station, and the price of fuel at the first station.

If more than one fuel station is within the base range 604, the select station module 612 can display all fuel stations within the base range 604. The select station module 612 can display the price of fuel for each of the fuel station within the base range 604.

The select station module 612 can determine the estimated total cost of a refuel by combining the station's fuel price with the costs of the fuel consumed to reach the fuel station. The select station module 612 can display the estimated refuel costs of all the fuel stations within the base range 604, allowing the driver to select the cheapest fuel station based on price and fuel consumption.

The recommend behavior module 614 can detect how the driver's speed, braking frequency, and acceleration patterns are increasing or decreasing the base range 604. The recommend behavior module 614 can recommend instructions to the driver to increase fuel efficiency. For example, a driver in a secluded section of a highway could be far away from the next fuel station. For illustrative purposes, the next fuel station could be four miles outside the base range 604 of the vehicle. The recommend behavior module 614 can recommend a change in top speed, slower accelerations, and cruising behavior to increase fuel efficiency. The driver's modified behavior can increase the base range 604 so that a driver, low on fuel, can reach the next fuel station.

It has been discovered that the present invention provides a navigation system having the ability to recommend modifications to driver behavior in order to minimize fuel consumption. The navigation system can calculate vehicle parameters and route parameters to provide a fuel estimation and the base range 604. The navigation system can recommend a modification of the driver's behavior for increasing the base range 604 when the vehicle is low on fuel.

Figure 7:
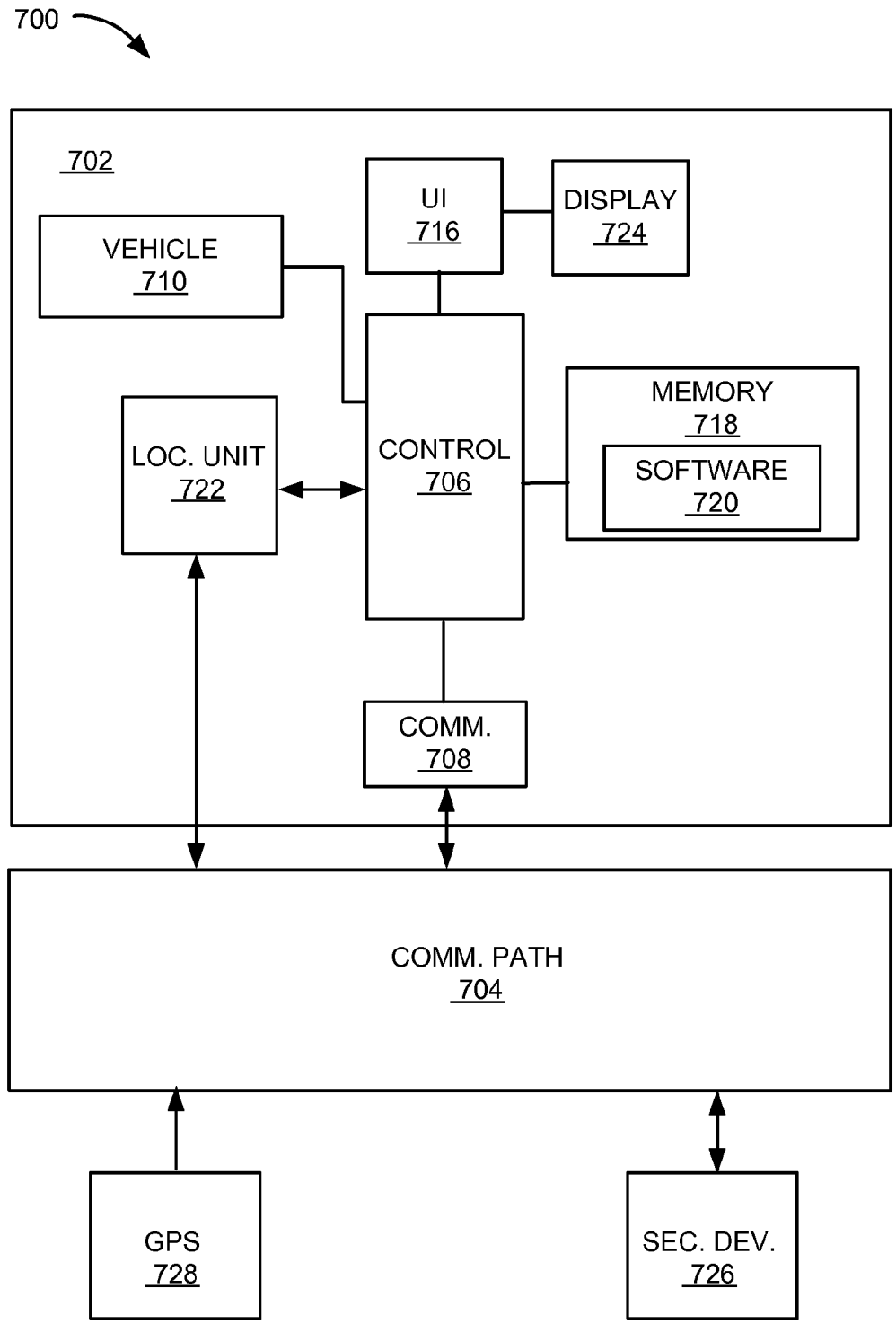
FIG. 7 is a block diagram of a navigation system in a second embodiment of the present invention.

Referring now to FIG. 7, therein is shown a block diagram of a navigation system 700 having route customization mechanism for fuel estimation in a second embodiment of the present invention. The navigation system 700 can include a first device 702 that can link to a communication path 704. The communication path 704 can link to a global positioning system 728. The communication path 704 can be linked to a second device 726 such as a server.

The first device 702 can access the communication path 704 for location services, such as the global positioning system 728. The first device 702 can be any of a variety of centralized or decentralized computing devices or any of a variety of mobile devices. For example, the first device 702 can be a computer, a computer in a grid computing pool, a virtualized computer, a computer in a cloud computing pool, or a computer in a distributed computing topology. The first device 702 can include routing functions or switching functions for coupling with the communication path 704.

As another example, the first device 702 can be a cellular phone, personal digital assistant, a notebook computer, or other multi-functional mobile communication or entertainment devices having means for coupling to the communication path 704. The communication path 704 can include the same variety of networks listed in the communication path 106 of FIG. 1.

The first device 702 can include a number of functional units. For example, the first device 702 can include a control unit 706 such as a processor or computer, a communication unit 708, a vehicle detect unit 710, a user interface 716, a memory 718, a first software 720, a location unit 722, and a multimedia display interface 724.

The control unit 706 can be coupled to the communication unit 708, the vehicle detect unit 710, the user interface 716, the memory 718, and the location unit 722. The memory 718 can include the first software 720. The user interface 716 can be linked to the multimedia display interface 724.

The multimedia display interface 724 can include a display or a projector. The user interface 716 can include a key pad, a touchpad, soft-keys, a keyboard, a microphone, a speaker, or any combination thereof to provide data and command inputs for the navigation system 700.

For illustrative purposes, the navigation system 700 is described with discrete functional blocks, although it is understood that the navigation system 700 can have a different configuration. For example, the control unit 706, the communication unit 708, the vehicle detect unit 710, and the location unit 722 may not be discrete functional blocks but may have one or more of the aforementioned blocks combined into one functional block.

The control unit 706 can execute the first software 720 and can provide the intelligence of the first device 702. The control unit 706 can interact with the vehicle detect unit 710, the communication path 704 via the communication unit 708, and the user interface 716.

The vehicle detect unit 710 can detect vehicle information and can interact with the vehicle parameters module 208 of FIG. 2. The driver can provide an input to the first device 702 through the user interface 716.

The location unit 722 can provide location information and can be implemented in many ways. For example, the location unit 722 can be an inertial navigation system, cell-tower location system, accelerometer location system, or any combination thereof. The location unit 722 can be linked with the global positioning system 728 to determine location and provide location information. The location unit 722 can include the active and passive components, such as microelectronics or an antenna, for interaction with the communication path 704.

The memory 718, such as a volatile memory, a nonvolatile memory, an internal memory, an external memory, or a combination thereof, can store the first software 720, setup data, multimedia data, photos, text, sounds recordings, video, and other data for the operation of the navigation device. The memory 718 can also store the relevant information, such as maps, route information, traffic information, vehicle information, advertisement and point of interest (POI), navigation routing entries, driver profiles, or any combination thereof. The memory 718 can also store recorded, imaged, sampled or created relevant information to be transmitted to the first device 702.

The memory 718 can be implemented in a number of ways. For example, the memory 718 can be a nonvolatile storage such as non-volatile random access memory (NVRAM), Flash memory, or disk storage or a volatile storage such as static random access memory (SRAM).

The communication unit 708 can connect with the communication path 704 and can include active and passive components, such as microelectronics or an antenna, for interaction to the telecommunication system of the communication path 704.

The first software 720 can include the navigation system 200 of FIG. 2. For example, the first software 720 can include the select destination module 202 of FIG. 2, the base route module 204 of FIG. 2, the route parameters module 206 of FIG. 2, the vehicle parameters module 208 of FIG. 2, the modified route module 212 of FIG. 2, the traverse route module 214 of FIG. 2, the track fuel gauge module 216 of FIG. 2, the recommend refuel module 220 of FIG. 2, and the feedback module 222 of FIG. 2. The control unit 706 can execute the first software 720.

The user destination 201 of FIG. 2 can be inputted into the user interface 716. The control unit 706 can send the user destination 201 to the first software 720. The control unit 706 can access the global positioning system 728 through the communication unit 708 and the location unit 722. The first software 720 can generate the base routes 205. The base routes 205 can be displayed on the multimedia display interface 724. The driver can select the modified route 213 of FIG. 2 with the user interface 716. The control unit 706 can send the modified route 213 to the multimedia display interface 724 for displaying. The control unit 706 can execute the traverse route module 214 of FIG. 2, the recommend refuel module 220 of FIG. 2, and the feedback module 222 of FIG. 2.

The control unit 706 can operate the vehicle detect unit 710. The vehicle detect unit 710 can include sensors attached to the vehicle. For example, the sensors can include tire pressure sensors, vehicle weight sensors, fuel gauge sensor, and an engine sensor.

Figure 8:
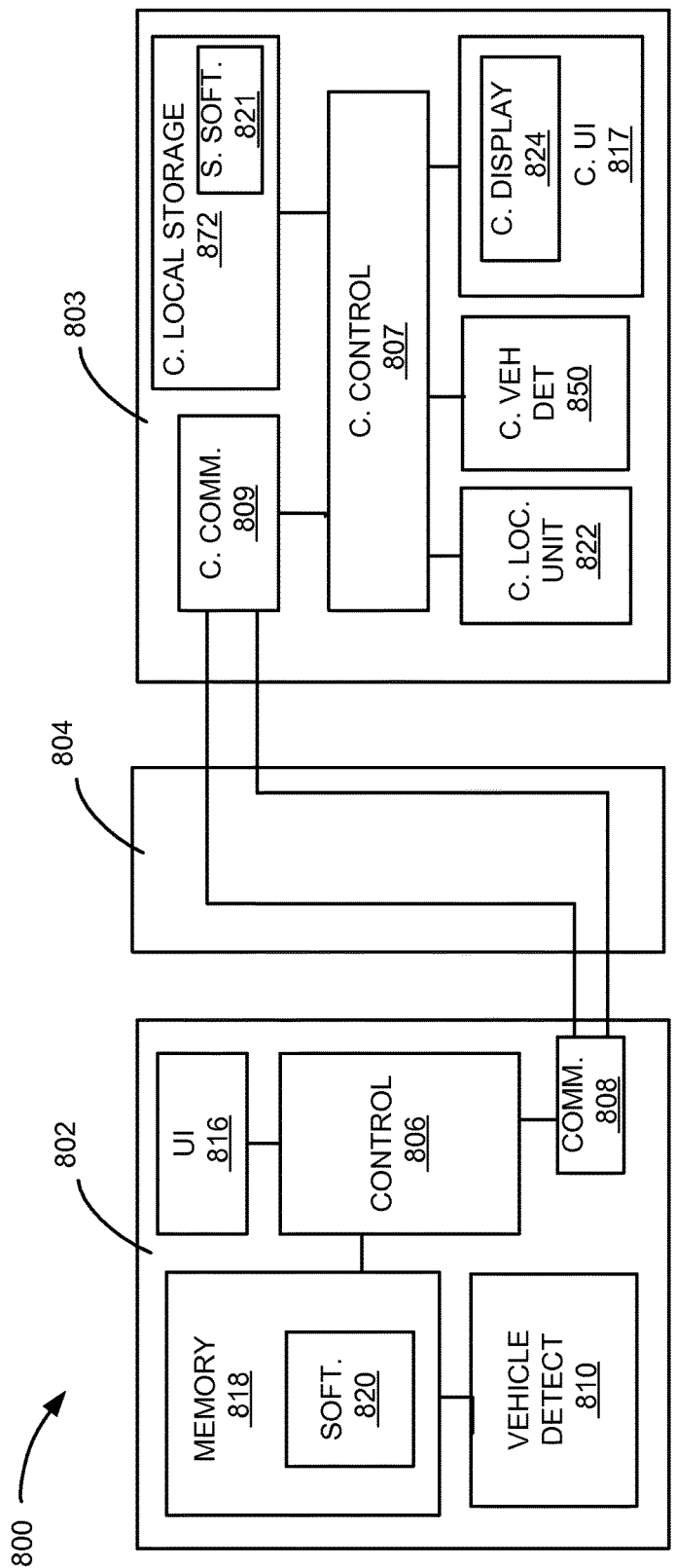
FIG. 8 is a block diagram of a navigation system in a third embodiment of the present invention.

Referring now to FIG. 8, therein is shown a block diagram of a navigation system 800 having route customization mechanism for fuel efficiency in a third embodiment of the present invention. A first device 802, such as a server or non-mobile computing device, can link to a second device 803, such as a client device or a mobile computing device, with a communication path 804.

The first device 802 can include routing functions or switching functions for coupling with the communication path 804 to communicate with the second device 803.

The second device 803 can be of any of a variety of mobile devices. For example, the second device 803 can be a cellular phone, personal digital assistant, a notebook computer, or other multi-functional mobile communication or entertainment devices having means for coupling to the communication path 804. The communication path 804 can be a variety of networks similar to networks listed in the communication path 106 of FIG. 1.

For illustrative purposes, the first device 802 is shown as a server. The first device 802 is shown in a single location, although it is understood that the server can be centralized or decentralized and located at different locations. For example, the first device 802 can represent real or virtual servers in a single computer room, distributed across different rooms, distributed across different geographical locations, embedded within a telecommunications network, virtualized servers within one or more other computer systems including grid or cloud type computing resources, or in a high powered client device.

Further, for illustrative purposes, the navigation system 800 is shown with the second device 803 as a client. The second device 803 can be a mobile computing device, although it is understood that the second device 803 can be different types of computing devices. For example, the second device 803 can be a mobile computing device, such as notebook computer, another client device, or a different type of client device.

Yet further for illustrative purposes, the navigation system 800 is shown with the first device 802 and the second device 803 as end points of the communication path 804, although it is understood that the navigation system 800 can have a different partition between the first device 802, the second device 803, and the communication path 804. For example, the first device 802, the second device 803, or a combination thereof can also function as part of the communication path 804.

The first device 802 can include a server control unit 806, such as a processor or a computer, a server communication unit 808, a vehicle detect engine 810, a user interface 816, and a memory 818. The memory 818 can include a first software 820. The server control unit 806 can be coupled to the server communication unit 808, the vehicle detect engine 810, a road conditions engine 812, a mapping engine 814, the user interface 816, and the memory 818.

For illustrative purposes, the navigation system 800 is shown with the first device 802 described with discrete functional blocks, although it is understood that the navigation system 800 can have the first device 802 in a different configuration. For example, the server control unit 806, the server communication unit 808, the memory 818, and the first software 820 may not be discrete blocks but may have one or more of the aforementioned blocks combined into one functional block.

The server control unit 806 can execute the first software 820 and can provide the intelligence of the first device 802 for interaction with the second device 803. The server control unit 806 can interact with the vehicle detect engine 810, the road conditions engine 812, the mapping engine 814, the communication path 804 via the server communication unit 808, and the user interface 816. The server communication unit 808 can send and receive information through the communication path 804.

The second device 803 can include, for example, a client control unit 807, such as a processor, coupled with a client local storage 872, a second software 821, a client communication unit 809, a client vehicle detect unit 850, a client location unit 822, and a client user interface 817 having a multimedia display interface 824. The client user interface 817 can also include a projector, a key pad, a touchpad, soft-keys, a keyboard, a microphone, a speaker, or any combination thereof to provide data and command inputs to the second device 803.

The client control unit 807 can execute the second software 821 from the client local storage 872. The client control unit 807 can provide the intelligence of the second device 803 for interaction with the first device 802. The second software 821 can allow the second device 803 to interact with the communication path 804 via the client communication unit 809 and with the client location unit 822.

The client location unit 822 can provide location information and be implemented in many ways. For example, the client location unit 822 can be a global positioning system (GPS), inertial navigation system, cell-tower location system, accelerometer location system, or any combination thereof. The client location unit 822 can include the active and passive components, such as microelectronics or an antenna, for interaction with the communication path 804.

The client local storage 872 can store the second software 821, setup data, multimedia data, photos, text, sounds recordings, video, and other data for the operation of the second device 803 as a navigation device. The client local storage 872 can also store relevant information, such as maps, route information, vehicle information, traffic information, advertisement and point of interest (POI), navigation routing entries, driver profiles, or any combination thereof, from the first device 802 or can be preloaded. The client local storage 872 can also store recorded, imaged, sampled or created relevant information to be transmitted to the first device 802.

The client local storage 872 can be implemented in a number of ways. For example, the client local storage 872 can be a nonvolatile storage such as non-volatile random access memory (NVRAM), Flash memory, or disk storage or a volatile storage such as static random access memory (SRAM).

The client communication unit 809 can connect to the server communication unit 808 through the communication path 804. The client communication unit 809 can include active and passive components, such as microelectronics or an antenna, for interaction to the telecommunication system of the communication path 804.

The navigation system 200 of FIG. 2 can be partitioned between the first software 820 and the second software 821. For example, the first software 820 can include the base route module 204 of FIG. 2, the route parameters module 206 of FIG. 2, the vehicle parameters module 208 of FIG. 2, the modified route module 212 of FIG. 2, the traverse route module 214 of FIG. 2, and the recommend refuel module 220 of FIG. 2. The server control unit 806 can execute the software modules partitioned on the first software 820.

For illustrative purposes, the second software 821 can include the select destination module 202 of FIG. 2, the track fuel gauge module 216 of FIG. 2, and the feedback module 222 of FIG. 2. Based on the size of the client local storage 872, the second software 821 can include additional modules of the navigation system 200 of FIG. 2. The client control unit 807 can execute the software modules partitioned on the second software 821.

The user destination 201 of FIG. 2 can be inputted into the multimedia display interface 824. The client control unit 807 can send the user destination 201 to the second software 821 and the first software 820.

The first software 820 can generate the base routes 205 of FIG. 2. The server communication unit 808 can send information like the base routes 205 to the second device 803 through the communication path 804. The base routes 205 can be displayed on the multimedia display interface 824.

The client control unit 807 can operate the client vehicle detect unit 850. The client vehicle detect unit 850 can include sensors attached to the vehicle. For example, the sensors can include tire pressure sensors, vehicle weight sensors, and an engine sensor. The client communication unit 809 can send tire information, vehicle weight information, and engine information to the first device 802.

Figure 9:
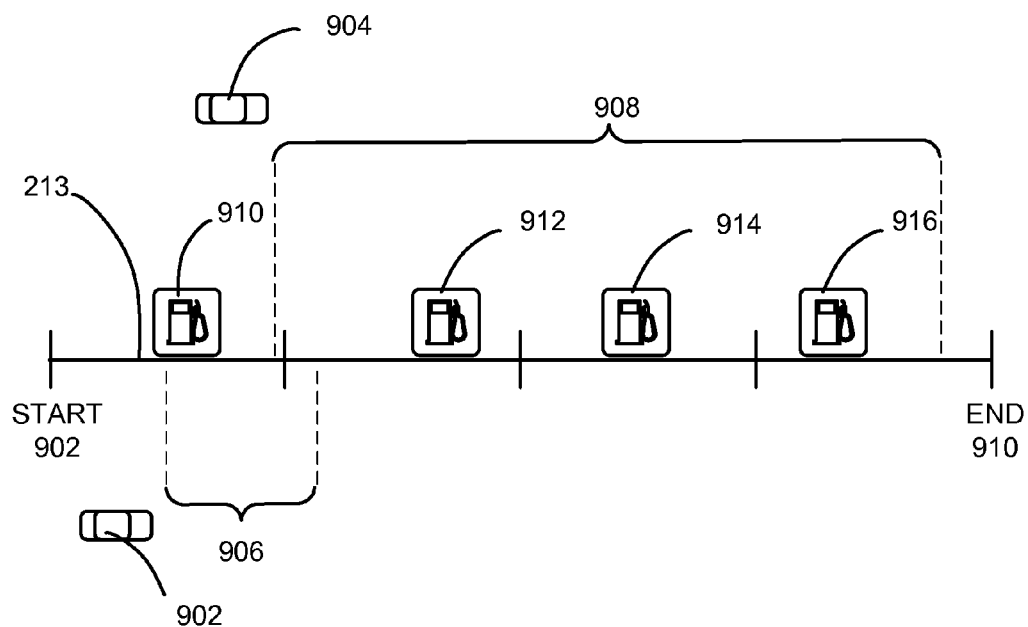
FIG. 9 is a diagrammatical example of an application of the navigation system recommend refuel module of FIG. 2.

Referring now to FIG. 9, therein is shown a diagrammatical view of a route in an example application of the navigation system 200 of FIG. 2. The diagram includes a first vehicle 902 and a second vehicle 904. The diagram also includes a first base range 906 for the first vehicle 902 and a second base range 908 for the second vehicle 904.

The diagrammatic view depicts an example of the first vehicle 902 and the second vehicle 904 depicted traveling from left to right of the modified route 213 of FIG. 2. The modified route 213 can include a first fuel station 910, a second fuel station 912, a third fuel station 914, and a fourth fuel station 916.

For illustrative purposes, the first fuel station 910 sells fuel at $3.35. The second fuel station 912 sells fuel at $3.20.

The third fuel station 914 sells fuel at $2.97 and the fourth fuel station 916 sells fuel at $3.26.

The first vehicle 902 has a low level of fuel remaining. The recommend refuel module 220 of FIG. 2 can enable the detect vehicle range module 602 of FIG. 6. The detect vehicle range module 602 can calculate the first base range 906 based on local terrain and remaining fuel. The critical station search module 606 of FIG. 6 can enable the first station fuel module 608. The first station fuel module 608 of FIG. 6 can detect the first fuel station 910. The critical station search module 606 can determine that the first vehicle 902 can only reach one refuel station.

The first base range 906 represents the distance the first vehicle 902 can travel before running out of fuel. The recommend refuel module 220 of FIG. 2 can display a critical fuel level warning and can warn the driver of the first vehicle 902 that a refuel must occur at the first fuel station 910. The recommend refuel module 220 can display the first base range 906 to the driver.

The driver of the second vehicle 904 has more refuel options. The detect vehicle range module 602 of FIG. 2 can calculate the second base range 908. The second base range 908 represents the distance that the second vehicle 904 can travel before the vehicle runs out of fuel. The first station fuel module 608 can detect that the second fuel station 912 is the first station within the second base range 908. The critical station search module 606 of FIG. 6 can detect that more than one fuel station is within the second base range 908.

The critical station search module 606 of FIG. 6 can enable the second station fuel module 610 of FIG. 6. The second station fuel module 610 can detect that the second fuel station 912, the third fuel station 914, and the fourth fuel station 916 are within the second base range 908. The second station fuel module 610 can display the prices of the fuel stations within the second base range 908.

For example, the select station module 612 of FIG. 6 can display the prices of each station and can recommend for the driver to stop at the third fuel station 914. The third fuel station 914 is selling fuel at the cheapest price.

In addition, the recommend refuel module 220 of FIG. 2 can calculate and display the estimated total costs to reach each of the fuel stations. The recommend refuel module 220 can calculate the estimated total cost of each fuel station by combining the fuel price to the fuel consumed to reach each fuel station. The recommend refuel module 220 can display a list of each fuel station's estimated total cost. The driver of the second vehicle 904 can select a fuel station based on the lowest total cost to refuel.

Figure 10:
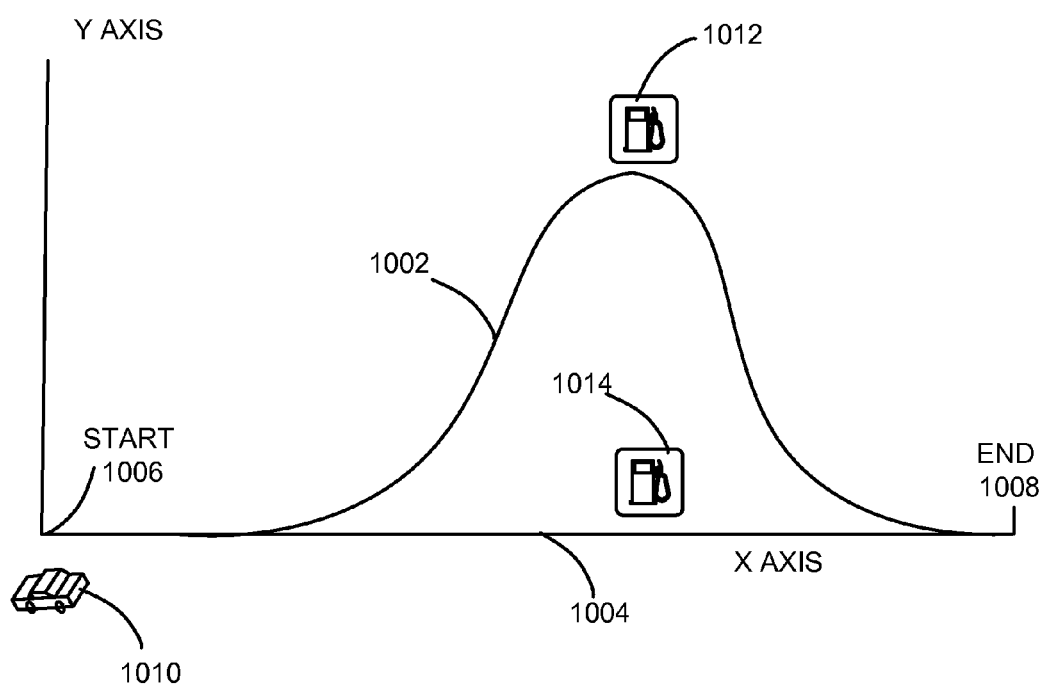
FIG. 10 is an example of an application of the navigation system having route customization mechanism for fuel estimation.

Referring now to FIG. 10, therein is shown an example of an application of the navigation system 200 of FIG. 2. The example represents two routes, whereas the x-axis direction represents distance and the y-axis direction represents elevation. The example includes an elevated route 1002, a flat route 1004, a start point 1006, an end point 1008, a vehicle 1010, a first fuel station 1012 and a second fuel station 1014. The vehicle 1010 is depicted traveling from left to right in the example.

At the start point 1006, the driver can input the user destination of FIG. 2 into the select destination module 202 of FIG. 2. The base route module 204 of FIG. 2 can generate the base routes 205 to the end point 1008. The base routes 205 can be sent to the route parameters module 206 of FIG. 2 and the modified route module 212 of FIG. 2.

Additionally, the vehicle parameters module 208 of FIG. 2 can detect the capabilities of the vehicle 1010 and this information can be sent to the modified route module 212 of FIG. 2. Furthermore, the driver can create the custom route priority 516 from the route preference module 210 of FIG. 2.

For example, the driver assigns a weight of 5 out of 10 to the ecological efficient module 502 of FIG. 5, a weight of 4 out of 10 to the fastest route module 506 of FIG. 5, and a weight of 1 out of 10 to the shortest route module 504 of FIG. 5. Based on the driver input, the route preference module 210 can create the custom route priority 516 that can be sent to the modified route module 212 of FIG. 2.

Using information from the route parameters module 206 of FIG. 2, and the vehicle parameters module 208 FIG. 2, the modified route module 212 of FIG. 2 can calculate and display the fuel estimation for each of the base routes 205. For example, the modified route module 212 can calculate the fuel estimation based on the weight of the vehicle 1010, the extra fuel consumed by climbing the elevated route 1002, traffic conditions, and other route and vehicle parameters. The custom route priority 516 can determine the routes that are recommended by the modified route module 212.

For illustrative purposes, the modified route module 212 of FIG. 2 can display the flat route 1004 and the elevated route 1002 as recommended routes. The modified route module 212 can display that the elevated route 1002 is a total distance of 90 distance units, estimated time is 2.5 hours, and the fuel estimation is 6 volume units. The modified route module 212 can display that the flat route 1004 is a total distance 107 of distance units, estimated time is 2.2 hours, and the fuel estimation is 4 volume units. The flat route 1004 can represent a long road that curves around hilly terrain. The elevated route 1002 can represent a route that directly climbs over hilly terrain instead of the flat route 1004 that curves around the hilly terrain.

Based on the driver's input for the custom route priority 516 of FIG. 5, the modified route module 212 of FIG. 2 will recommend the flat route 1004. Although the elevated route 1002 is 90 distance units and less distance units than the flat route 1004, the flat route 1004 more accurately conforms to the driver's input for the custom route priority 211 of FIG. 2. In this example, the custom route priority 211 has 5 points assigned to the ecological efficient module 502 of FIG. 5. The flat route 1004 consumes less fuel than the elevated route 1002 because more fuel is not needed to accelerate up an elevated road.

The custom route priority 211 in this example has 4 points assigned to the fastest weight 512 of FIG. 5. The flat route 1004 more accurately conforms to the 4 points assigned to the fastest weight 512. The flat route 1004 is 2.2 hours whereas the elevated route 1002 is 2.5 hours. The vehicle 1010 can achieve faster speeds on the flat route 1004 than on the elevated route 1002. The modified route module 212 of FIG. 2 can display the flat route 1004 first as the flat route 1004 conforms to the custom route priority 211.

As another example, the driver can enable the recommend refuel module 220 of FIG. 2 at the start point 1006 or at anytime, to find a fuel station that minimizes fuel consumption. The modified route module 212 of FIG. 2 can display the first fuel station 1012 and the second fuel station 1014 and calculate the estimated cost to refuel at each station. The driver can then select a fuel station that has the lowest total cost to refuel.

For illustrative purposes, the first fuel station 1012 has a price of 1 dollar and the second fuel station 1014 has a price of 3 dollars. The modified route module 212 of FIG. 2 can calculate the fuel estimation needed to reach the first fuel station 1012 and the second fuel station 1014. The modified route module 212 can display the estimated total cost to reach a fuel station by combining the fuel price with the fuel consumed to reach the fuel station.

For example, the first fuel station 1012 involves climbing a steep elevation. The first fuel station 1012 will have a greater fuel consumption than the second fuel station 1014 because of fuel consumed from climbing the elevation. The modified route module 212 of FIG. 2 can display that the first fuel station 1012 has an estimated cost of 3.9 dollars and that the second fuel station 1014 has an estimated cost of 3.2 dollars. Although the listed price of fuel at the first fuel station 1012 is one dollar, the driver can select to refuel at the second fuel station 1014 because the estimated cost to refuel is lower.

Figure 11:
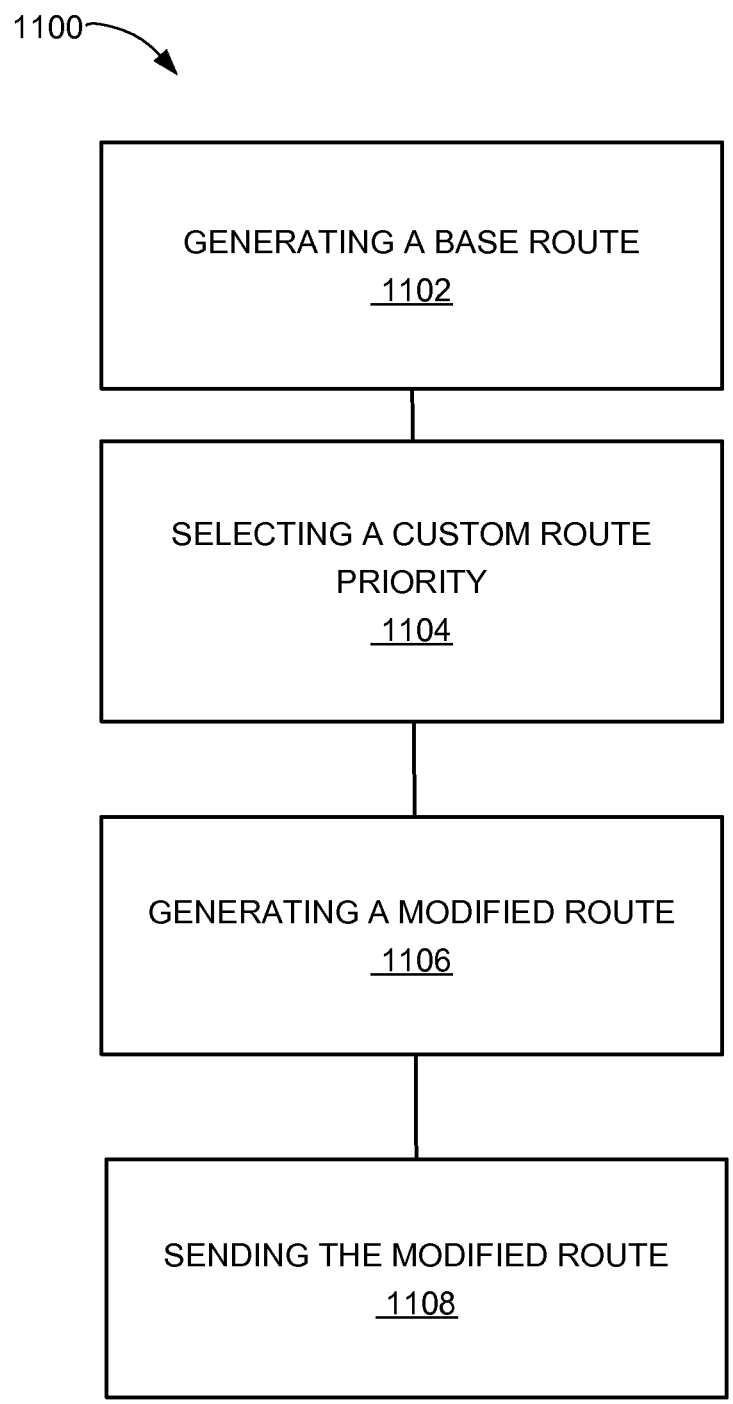
FIG. 11 is a flow chart of a method of operation of the navigation system in a further embodiment of the present invention.

Referring now to FIG. 11, therein is shown a flow chart of a method 1100 of operation of the navigation system 200 in a further embodiment of the present invention. The method 1100 includes generating a base route in a block 1102; selecting a custom route priority based on a route preference in a block 1104; generating a modified route based on the base route and the custom route priority in a block 1106; and sending the modified route for display on a device in a block 1108.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and efficiency.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method of operation of a navigation system comprising:
    generating a base route based on determining a frequency of a street type within the base route for calculating an effect of the street type on a fuel consumption;
    selecting a route preference by varying scalar values assigned to an ecological weight, a shortest weight, and a fastest weight, the ecological weight changes the route preference for minimizing the fuel consumption;
    selecting a custom route priority based on the route preference;
    determining whether to send an alert indicating a refuel must occur based on whether a number of fuel stations within a base range is only one;
    calculating a lowest estimated cost based on a fuel price and the fuel consumption for reaching one of the fuel stations within a vehicle's range if a fuel level exceeds a predefined level, otherwise one of the fuel stations with a lowest actual cost within the vehicle's range is recommended if the fuel level meets the predefined level based on the number of the fuel stations within the base range is greater than one;
    tracking a driver behavior based on recording a driver's habit during a trip for learning the driver behavior where the driver behavior is tracked by a global positioning system in real-time;
    generating a modified route, with a control unit implemented as hardware, based on the base route, the lowest estimated cost, the custom route priority, the driver behavior, or a combination thereof; and
    sending the modified route, the alert, or a combination thereof for displaying on a device.

2. The method as claimed in claim 1 wherein generating the modified route includes calculating traction information.

3. The method as claimed in claim 1 further comprising:
    traversing the modified route;
    scanning a fuel station and the fuel price associated with the fuel station along the modified route; and
    recommending the refuel based on the fuel station.

4. The method as claimed in claim 1 further comprising:
    traversing the modified route;
    generating a fuel estimation for calculating the base range of the device;
    locating a fuel station approximately along the modified route; and
    recommending the refuel based on the base range and with the fuel station within the base range.

5. The method as claimed in claim 1 wherein generating the modified route includes:
    traversing the modified route;
    generating a fuel estimation for calculating the base range of the device;
    locating a fuel station approximately along the modified route and beyond the base range;
    recommending the driver behavior change to extend the base range to reach the fuel station; and
    recommending the refuel based on the driver behavior change and the extended value of the base range.

6. A method of operation of a navigation system comprising:
    generating a base route based on determining a frequency of a street type within the base route for calculating an effect of the street type on a fuel consumption;
    selecting a route preference by varying scalar values assigned to an ecological weight, a shortest weight, and a fastest weight, the ecological weight changes the route preference for minimizing the fuel consumption;
    selecting a custom route priority based on a route preference;
    determining whether to send an alert indicating a refuel must occur based on whether a number of fuel stations within a base range is only one;
    calculating a lowest estimated cost based on a fuel price and the fuel consumption for reaching one of the fuel stations within a vehicle's range if a fuel level exceeds a predefined level, otherwise one of the fuel stations with a lowest actual cost within the vehicle's range is recommended if the fuel level meets the predefined level based on the number of the fuel stations within the base range is greater than one;
    tracking a driver behavior based on recording a driver's habit during a trip for learning the driver behavior where the driver behavior is tracked by a global positioning system in real-time;

generating a modified route, with a control unit implemented as hardware, based on the base route, the lowest estimated cost, the custom route priority, the driver behavior, or a combination thereof;

sending the modified route, the alert, or a combination thereof for displaying on a device and for traversing the modified route by the device;

recommending the refuel based on the lowest estimated cost.

7. The method as claimed in claim 6 wherein generating the modified route includes utilizing a route profile for the base route.

8. The method as claimed in claim 6 wherein generating the modified route includes utilizing a vehicle profile for the base route.

9. The method as claimed in claim 6 wherein recommending the refuel based on a fuel station includes updating the modified route to the fuel station.

10. The method as claimed in claim 6 wherein generating the modified route includes utilizing a route profile for the base route with the route profile including an elevation profile and a pavements profile.

11. A navigation system comprising:
a user interface configured to:
select a route preference by varying scalar values assigned to an ecological weight, a shortest weight, and a fastest weight, the ecological weight changes the route preference for minimizing a fuel consumption,
select a custom route priority based on a route preference,
a control unit implemented as hardware, coupled to the user interface, configured to:
determine whether to send an alert indicating a refuel must occur based on whether a number of fuel stations within a base range is only one;
generate a base route based on determining a frequency of a street type within the base route to calculate an effect of the street type on the fuel consumption,
calculate a lowest estimated cost based on a fuel price and the fuel consumption to reach one of the fuel stations within a vehicle's range if a fuel level exceeds a predefined level, otherwise one of the fuel stations with a lowest actual cost within the vehicle's range is recommended if the fuel level meets the predefined level based on the number of the fuel stations within the base range is greater than one,
tracking a driver behavior based on recording a driver's habit during a trip for learning the driver behavior where the driver behavior is tracked by a global positioning system in real-time,
generate a modified route based on the base route, the lowest estimated cost, the custom route priority, or a combination thereof, and
a communication unit, coupled to the control unit, configured to:
send the modified route, the alert, or a combination thereof to display on a device.

12. The system as claimed in claim 11 wherein the hardware control unit is configured to calculate traction information.

13. The system as claimed in claim 11 wherein the hardware control unit is configured to:
scan a fuel station and the fuel price associated with the fuel station along the modified route; and
recommend the refuel based on the fuel station.

14. The system as claimed in claim 11 further comprising:
a location unit, coupled to the hardware control unit, configured to detect a traversal along the modified route; and
wherein the hardware control unit is configured to:
generate a fuel estimation for calculating the base range of the device;
locate a fuel station approximately along the modified route; and
recommend the refuel based on the base range and with the fuel station within the base range.

15. The system as claimed in claim 11 further comprising:
a location unit, coupled to the hardware control unit, configured to detect a traversal along the modified route; and
wherein the hardware control unit is configured to:
generate a fuel estimation for calculating base range of the device;
locate a fuel station approximately along the modified route and beyond the base range;
recommend the driver behavior change to extend the base range to reach the fuel station; and
recommend the refuel based on the driver behavior change and the extended valued of the base range.

16. The system as claimed in claim 11 further comprising:
a location unit, coupled to the hardware control unit, configured to detect a traversal along the modified route by the device; and
wherein the hardware control unit is configured to:
scan a fuel station and the fuel price associated with the fuel station along the modified route; and
recommend the refuel based on the fuel station.

17. The system as claimed in claim 16 wherein the hardware control unit is configured to utilize a route profile for the base route.

18. The system as claimed in claim 16 wherein the hardware control unit is configured to utilize a vehicle profile for the base route.

19. The system as claimed in claim 16 wherein the hardware control unit is configured to update the modified route to a fuel station.

20. The system as claimed in claim 16 wherein the hardware control unit is configured to utilize a route profile for the base route with the route profile including an elevation profile and a pavements profile.

* * * * *